United States Patent [19]

Weiler et al.

[11] Patent Number: 5,407,033

[45] Date of Patent: Apr. 18, 1995

[54] BRAKE UNIT AND SPRING ENERGY ACCUMULATOR FOR IT

[75] Inventors: Rolf Weiler, Eppstein; Wilhelm Haberland, Frankfurt am Main; Dieter Kristen, Langen; Goetz Mehner, Weiterstadt, all of Germany

[73] Assignee: Alfred Teves GmbH, Frankfurt am Main, Germany

[21] Appl. No.: 930,674

[22] PCT Filed: Mar. 29, 1991

[86] PCT No.: PCT/EP91/00613

§ 371 Date: Oct. 2, 1992

§ 102(e) Date: Oct. 2, 1992

[87] PCT Pub. No.: WO91/15384

PCT Pub. Date: Oct. 17, 1991

[30] Foreign Application Priority Data

Apr. 2, 1990 [DE] Germany .................. 40 10 547.4
Apr. 6, 1990 [DE] Germany .................. 40 11 164.4

[51] Int. Cl.[6] ........................ B60T 1/06; B60T 13/22
[52] U.S. Cl. ........................ 188/72.6; 188/33; 188/72.9; 192/4 A; 192/85 R
[58] Field of Search ............... 188/72.1, 72.9, 73.46, 188/166, 33, 71.3, 72.2, 140 A; 267/70-72, 170, 249; 105/96.1, 96.2; 192/85 R, 4 A; 180/165, 72.4, 72.6

[56] References Cited

U.S. PATENT DOCUMENTS

| 2,889,785 | 6/1959 | Browne | 188/33 X |
| 3,917,040 | 11/1975 | Radcliffe et al. | 192/4 A |
| 4,179,016 | 12/1979 | Alderman et al. | 192/4 A |

FOREIGN PATENT DOCUMENTS

| 0056779 | 7/1982 | European Pat. Off. . | |
| 0260100 | 3/1988 | European Pat. Off. . | |
| 2325848 | 12/1973 | Germany . | |
| 2922472 | 12/1979 | Germany | 188/72.9 |
| 2840836 | 4/1980 | Germany . | |
| 3343596 | 6/1985 | Germany . | |
| 4003732 | 8/1991 | Germany . | |
| 2030651 | 4/1980 | United Kingdom . | |
| 159513 | 8/1981 | United Kingdom | 192/4 A |

Primary Examiner—Robert J. Oberleitner
Assistant Examiner—Josie A. Ballato
Attorney, Agent, or Firm—Robert P. Seitter; J. Gordon Lewis

[57] ABSTRACT

An improved spring energy accumulators are used to actuate brake units mounted to either end of a transmission for a track laying vehicle drive train. The housing of the spring energy accumulator is directly mounted to the housing of the brake unit. The spring energy accumulators are designed to allow installation and removal of hydraulic components contained in an insert cylinder without disturbing a spring mounted highly compressed within the housing.

9 Claims, 4 Drawing Sheets

BRAKE UNIT AND SPRING ENERGY ACCUMULATOR FOR IT

BACKGROUND OF THE INVENTION

The invention is related to a brake unit, in particular for the drive train of track-laying vehicles having track drive sprockets on either side of the vehicle, and to a spring energy accumulator used with such brake units. In a brake unit of this kind, it has been the practice in the prior art to mount a brake unit to a lateral transmission unit associated with each sprocket and mounted on the hull. Such brake units require a spring energy accumulator. In the prior brake units, the spring energy accumulator has been mounted to the hull of the track-laying vehicle, separately from the brake and also separately from the lateral transmission gear. The necessary transmission of the force from the spring energy accumulator to the brake takes place by means of an additional force transmitting unit. This prior art arrangement is shown diagrammatically in FIG. 1.

The assembly of the prior art brake unit is carried out as follows:

The spring energy accumulator 14 is preassembled with a bearing pedestal. The vehicle manufacturer then fixes the brake, which is separate from the spring energy accumulator, to the lateral transmission gear, as illustrated in FIG. 1. Furthermore, the preassembled unit, composed of the spring energy accumulator and of the bearing pedestal, is aligned at the vehicle hull of the track-laying vehicle with respect to the brake and mounted by the vehicle manufacturer. Since the spring energy accumulator is fixed to the rigid hull, it is subjected to considerable blows and vibrations, and a tightening strap may additionally be provided around the spring energy accumulator which is being welded to the vehicle hull, interposing a retaining element.

Disadvantages result from the state-of-the-art design. The blows and vibrations which are brought to bear by the hull directly on the spring energy accumulator may lead to malfunction, or cause breakage of the bearing pedestal or tightening strap. The need for the the tightening strap and force deflection unit results in additional costs. The need for alignment and connection of these elements also increases the difficulty of assembly of the vehicle.

The present invention has as an object to render such a brake unit less expensive and easier to assemble.

In the prior art arrangement, a spring energy accumulator as shown in German published application no. 2,840,836 was utilized. It is necessary in that design to release the heavy compressed spring used to apply the brake in order to service the hydraulic parts, which must be individually disassembled from the spring energy accumulator.

Accordingly, it is another object of the present invention to provide an improved spring energy accumulator of the general type described, in which all of the hydraulic components can be removed as an assembly for service without disturbing the compressed spring.

SUMMARY OF THE INVENTION

The invention basically consists in directly mounting each housing of the spring energy accumulator onto the housing of the respective brake which in turn is mounted to a respective end of the transmission, rather than to offset fix the spring energy accumulators to the hull. This results in many advantages. The spring energy accumulator housing now combines the functions of accommodating the spring energy accumulator components, of fixing the spring energy accumulator to the brake and of transmitting the reactive forces of the spring energy accumulator into the brake housing. In addition, only one mechanical interface is required for coupling the brake to the vehicle, so that the risk of faulty assembly is low. Moreover, a direct transmission of forces within the brake unit is achieved, with no other vehicle components involved. As a result, the prior-art force deflection unit 16 is eliminated. The whole brake unit including the spring energy accumulator, is mounted to the main transmission assembly of the vehicle, preferably, as illustrated in the lower section of FIG. 1, to the steering gear and is, therefore, damped with respect to the vibrations and to the blows of the hull in comparison to fixing it to the hull, or to supporting it at the lateral transmission gear mounted on the hull.

The spring energy accumulator is designed to allow installation and removal of hydraulic components contained in an insert cylinder without disturbing a spring mounted highly compressed within the housing.

A lever is attached to the brake unit ball pressure plate, the lever attachment directly engaged by a push rod of the spring energy accumulator, so that the force transmitting unit is not required.

The push rod end is forked and directly pinned to the rotary lever to eliminate the need for a separate force transmitting element.

Since, moreover, the main transmission assembly is also assembled to the engine, the advantage achieved by summing up all these aspects is that the unit composed of the transmission, engine, and of the brake units of the track-laying vehicle needs to be mounted at the hull at only three bearing points, two of them being fixed directly to the two brake unit housings. In repair operations, this means that the complete unit consisting of the engine, main transmission assembly and brake units may be pulled out of the hull as one unit, and only mechanical transmission elements, such as, for example, cable lines going to the driver's cab, need to be uncoupled. Since hydraulic lines no longer must be detached, this mode of assembly eliminates problems due to the formation of air pockets in the hydraulic lines applies just as well to the functioning of the brake unit.

Due to the connection between the spring energy accumulator and the brake it will, furthermore, become possible to lift out the whole brake unit through the servicing hatch for the drive train.

According to another aspect of the invention, the spring energy accumulator is constructed so that all of the hydraulic components are contained in a cylinder insert which can be removed as an assembly without disturbing the spring. This is accomplished by providing an open ended tubular spring housing member with an in turned flange at one end. A tubular spring retainer cup includes an outwardly turned lip at one end abutted against the spring housing flange and in inturned flange at the other end. The heavy accumulator spring is assembled into the other end of the spring housing with one end positioned against the spring retainer cup and compressed in a press a sufficient distance to enable an end plate to be positioned within the other end of the housing, and a retainer installed to hold the spring in the compressed state. An insert cylinder having an internal bore containing the hydraulic components can simply be slid into the spring retainer cup with an engagement rod projecting through the inturned flange and the end plate. The insert cylinder has an outward extending shoulder against which the inward flange of the spring housing is abutted and fastened.

DETAILED DESCRIPTION

Figure 1:
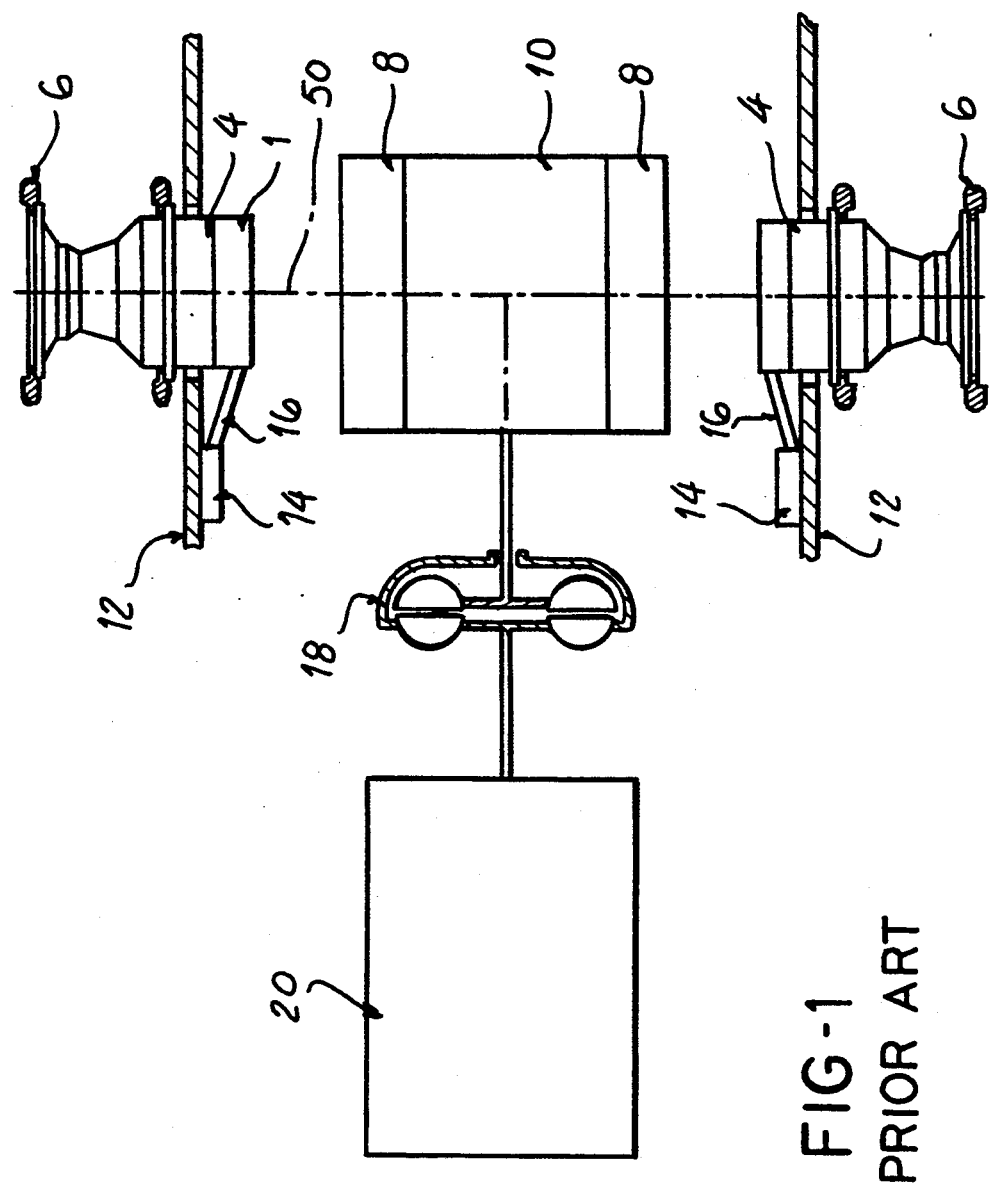
FIG. 1 is a plan diagrammatic view of the prior art drive train of a track laying vehicle.

In FIG. 1, a prior art drive train of a track-laying vehicle is diagrammed. An engine 20 acts through a converter 18 on a main transmission 10 acting through a driving axle 50 on separated lateral transmission gears 4 also forming part of the drive train. The driving axle 50 also drives the sprocket wheels 6.

In the prior design, the brake housings 1 are coupled by screws to a respective lateral transmission gear 4, while each of the spring energy accumulators 14 associated with a respective brake unit 1 is connected by screws to the vehicle hull 12 through a bearing pedestal (not shown). Due to the high mechanical stresses applied to the connection to the hull, the spring energy accumulators 14 are additionally connected to the hull through a tightening strap (not illustrated). Through a force deflection unit 16, represented symbolically, the force exerted by each spring energy accumulator 14 is transmitted to the associated brake 1 at each lateral transmission gear 4.

Figure 1A:
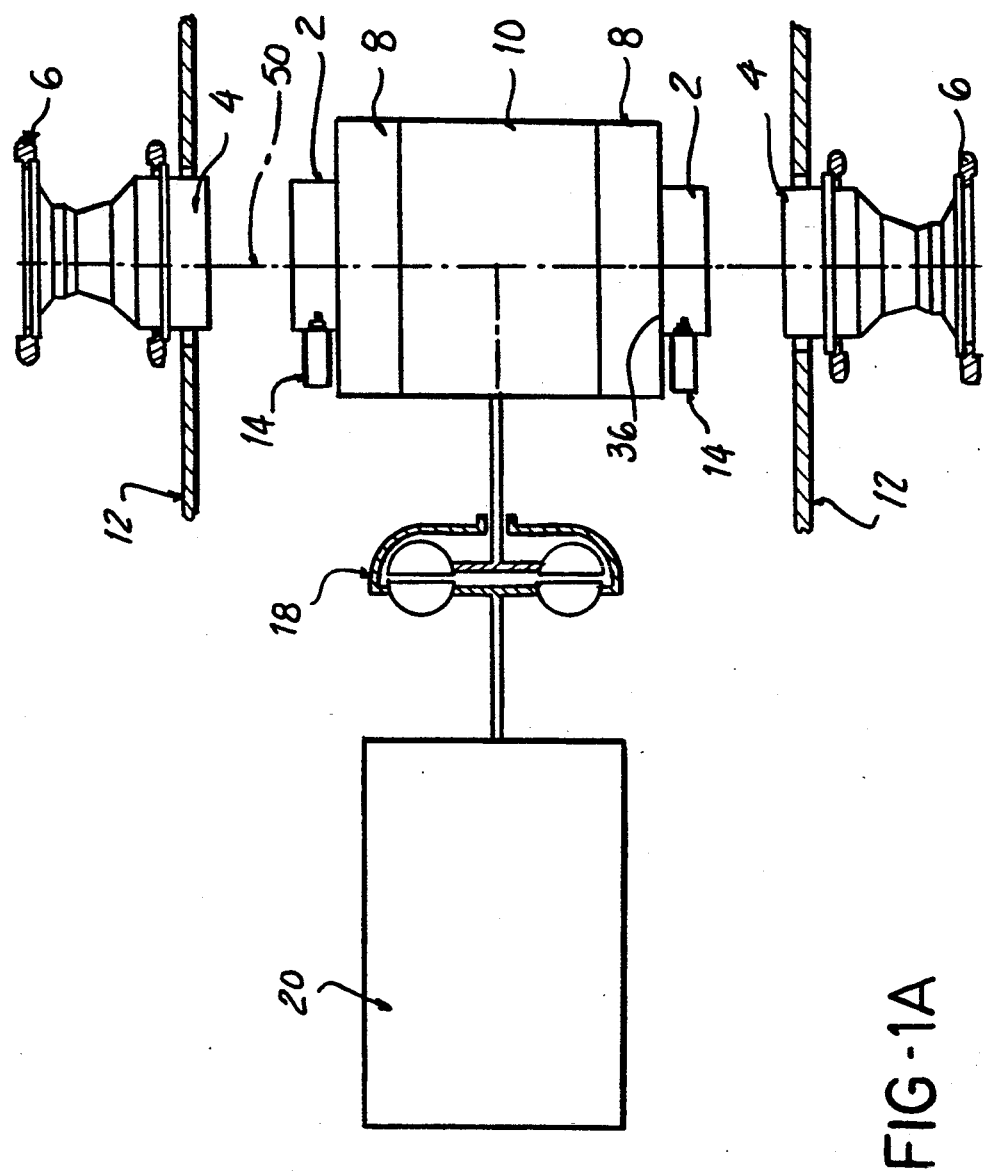
FIG. 1A is a plan diagrammatic view of the improved drive train according to the invention for a track laying vehicle.

In FIG. 1a, the differences between the inventive design as compared to the prior art one which is shown in FIG. 1 can be clearly appreciated. The spring energy accumulators 14 are fixed to the housing of the associated brake 2, each brake 2 being fixed to a steering gear 8 located on each outboard end of the main transmission assembly 10. As will be seen from FIG. 1, the force deflection unit 16 is eliminated. Furthermore, it will be possible to withdraw the whole driving unit together with the brake units 2 out of the servicing hatch in the hull, provided the driving axles 50 have previously been separated from the driving unit and the three bearing points been detached.

Figure 2:
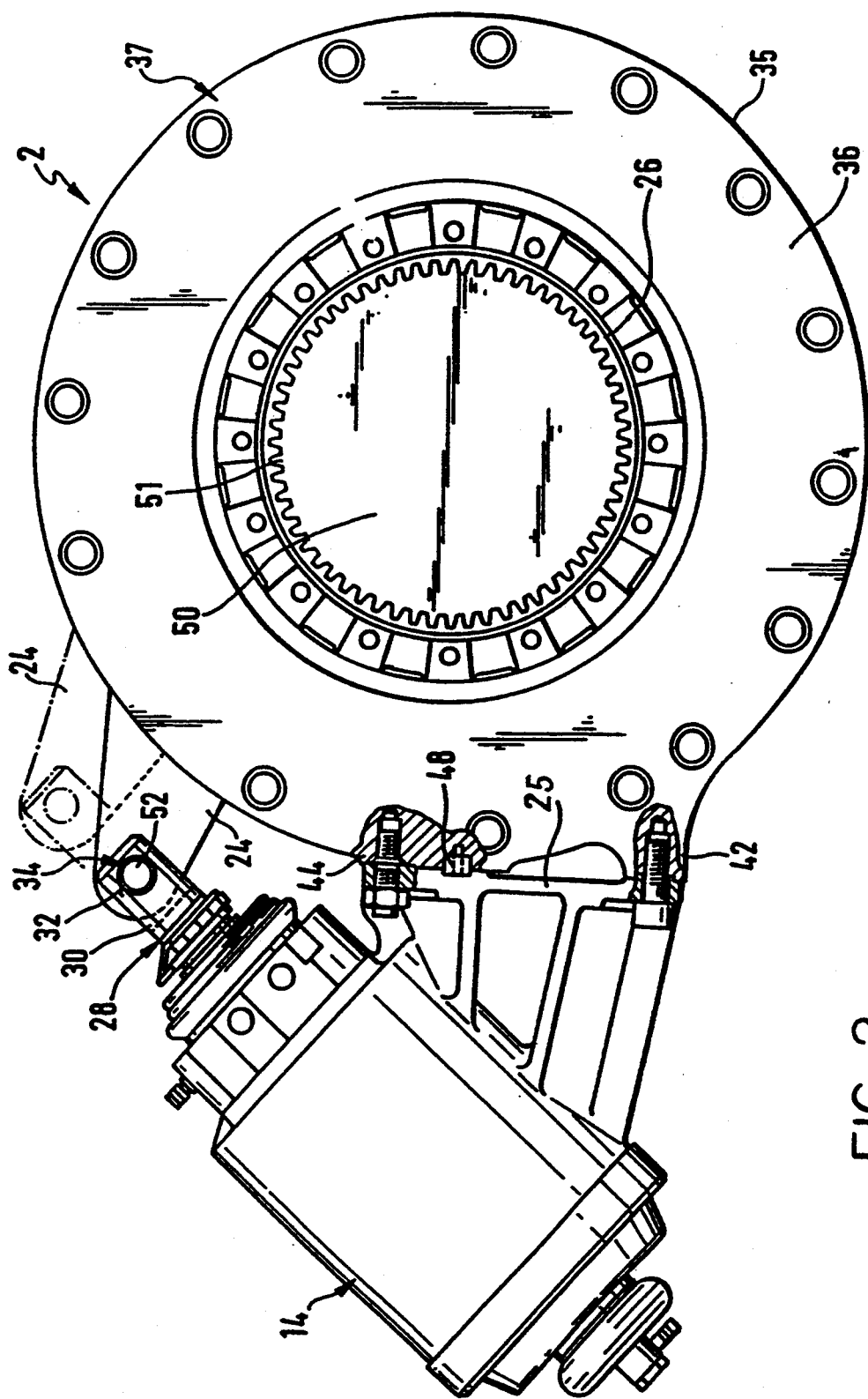
FIG. 2 is an end view of a brake unit with a spring energy accumulator fixed to the housing of the brake, shown in partial section, with the motion of the actuating lever shown in phantom.

Further details of the invention are revealed by FIG. 2 in which the spring energy accumulator 14 is represented in outline, a rod 28 serving to actuate the brake 2 projecting out at its front end. The operation and structural details of a spring energy accumulator is described in the German patent application published without examination, No. 2,840,836. Although there is hereinafter described certain improvements in this device.

In the right half of FIG. 2, the brake 2 is shown in outline. More precisely, the lateral surface 36 of the brake housing 37 is illustrated which faces away from the steering gear 8, that is to say, the bottom side in FIG. 1a. Within the annular lateral surface 36 an annular part of the brake disc 26 can be seen. The brake disc is driven by a driving shaft 50 which is coupled to the brake disc 26 through spline teeth 51. The internal structure of the brake 2 is not the subject matter of the present invention and will, therefore, not be described in more detail. A suitable disc brake is described, for example, in German patent application published without examination, No. 4,003,732.

The internal expanding clutch-type disc brake has an annular housing within which the brake disc 26 is rotated, while at least one of the two lining discs positioned on either side of the brake disc 26 is fixed rotationally but axially slidable with respect to the housing 37. A ball pressure plate (not shown) arranged between a lateral surface 36 of the brake housing and a lining disc is rotated by the spring energy accumulator 14. As a result, the lining disc will shift its position axially with respect to the ball pressure plate. This means that the brake 2 will become effective when the rod 28 advances into the position illustrated by dash-dotted lines in FIG. 2 to rotate an actuating lever 24, which is integral with the ball pressure plate, since in this way the two lining discs will be urged through the ball pressure plate against the brake disc 26 being axially slidably supported on the driving shaft 50.

A particular feature of the invention is the fixing of the spring energy accumulator 14 through a bearing pedestal 25 to suitable mounting pads 42, 44, on the generally circular surface 35 of the brake housing 37. As is visible in FIG. 2 in a cut-away representation, the bearing pedestal 25 is mounted to the housing 37 by means of screws. In order to adjust the position of the bearing pedestal 25 and, thus, of the spring energy accumulator 14 with respect to the brake housing 37, appropriate grooves are machined both into the bearing pedestal and into the attachment 44 which are aligned with each other and secured in alignment by a key 48 inserted into the grooves. The spring energy accumulator 14 is mounted at approximately 45° to the pads 42, 44 on the brake housing 37, as shown, to minimize the space required.

The actuating force which is exerted by the spring energy accumulator 14 onto the actuating rod 28 is transmitted through the actuating lever 24 directly to the ball pressure plate. In this context, the end of the rod 28 is formed with a fork 30 provided with two holes which are in alignment with each other and into which the end of the actuating lever 24 projects with an aligned eyehole 32. A swivel connection 34 is created by a pin 52 inserted through the aligned holes.

Figure 3:
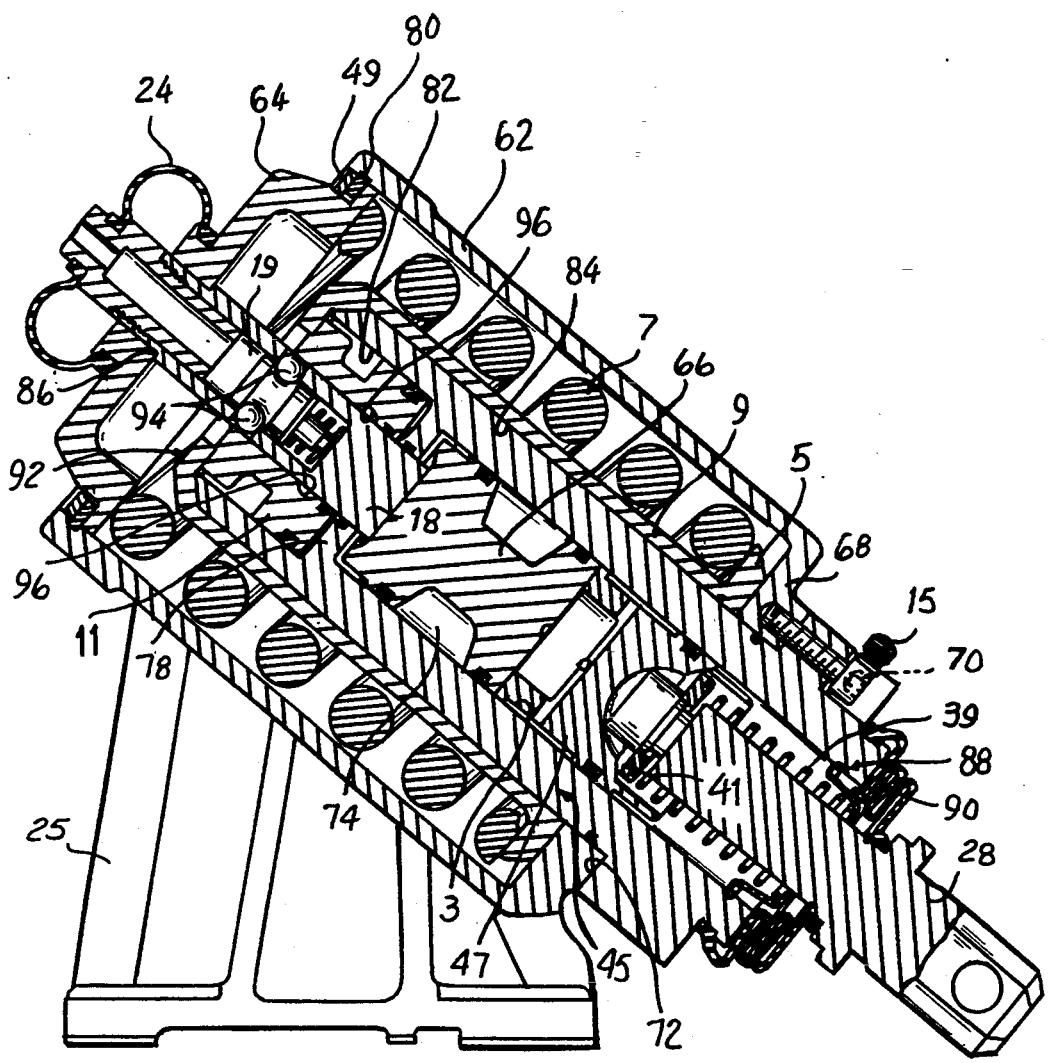
FIG. 3 is an enlarged sectional view of the spring energy accumulator shown in FIG. 2.

FIG. 3 shows the improved spring energy accumulator 14 of the general type as disclosed in the German patent application published without examination, No. 2,840,836. The inventive spring energy accumulator 14 will, therefore, be described only inasmuch as is required for the explanation of the distinguishing improved features from the German patent application published without examination, No. 2,840,836.

In FIG. 3 an open ended tubular housing 62 of the spring energy accumulator 14 is shown, whose front end plate 64 is retained by a circlip 80, front end plate 64 closing off the housing 62 at its left end. The major difference in comparison to the prior design consists in that the spring housing 62 is formed with an inwardly directed circumferential flange 68 abutting against an outwardly directed lip 5 of the spring retainer cup 9. The spring retainer cup 9 is inserted in the housing 62 from the top, as viewing the drawing, before installation of the front end plate 64. The spring retainer cup 9 is inserted together with the compression spring 7, disposed in the annular space between the inside of the housing 62 and the outside lip 5 of the spring retainer cup 9. The heavy compression spring 7 is compressed with a force of several tons by pushing the front end plate 64 into its closing position within the left end of the housing 62, and secured by the circlip 80, a seal 49 thereafter installed.

A self contained assembly including the compressed spring 7 thus results, which is comprised housing 62, of the front end plate 64, spring retainer cup 9, together with the compressed spring 7. This basic assembly is preassembled and need not be disassembled or otherwise disturbed in the event of a repair of the hydraulic components.

Into the spring assembly, an assembly of the hydraulic components is now inserted which is substantially contained within an insert cylinder 45 slid within a bore 84 of the spring retainer cup 9 to a point against the inside of an inturned flange 92 of the spring retainer cup 9. At the upper end of the insert cylinder 45, as viewing FIG. 3, the tensioning piston 11, known in the prior art, is positioned, retained within an internal bore 82 of the insert cylinder 45 by the frictional force of its sealing surfaces, so that it will not fall out when installing the insert cylinder 45. This is also true for the engagement rod 18, retained by the frictional force of the sealing surfaces both by a partition wall 78 of the insert cylinder 45 and by the internal surface of the tensioning piston 11.

As can be understood, the insert cylinder 45 containing the hydraulic components including the tensioning piston 11, and the engagement rod 18 can be inserted into the bore 84 of the spring retainer cup 8 without force from the bottom right.

During insertion, the engagement rod 18 will finally assume its position illustrated in the drawing in which a ridge 86 on the rod engagement 18 is abutted against the inside surface of the front end plate 64. Subsequently, an elastic protective cap 24 will be coupled with its one end engagement rod 18 and with its other end to the front end plate 64.

The upper end engagement rod 18, as viewing the drawing, has the simple design of the state-of-the-art spring energy accumulator as shown in FIGS. 1 and 3 of the German patent application published without examination, No. 2,840,836, but it may also be implemented in the split design with a separate piston (piston 29 there) as shown in FIG. 2 of that reference. The piston 29 there serves to release the accumulator spring by hydrostatic pressure, so that a release lever (lever 26 in FIGS. 1 and 3 of the German patent application 2,840,836) may be eliminated.

Details regarding the mode of operation of the tensioning piston 11 and regarding the actuation of the actuating engagement rod 18 and its release as well as regarding the action of the compression spring 7 within the spring retainer cup 9 can be obtained from the German patent application published without examination, No. 2,840,836.

Suffice it to say that upon pressurization of the space between piston 11 and partition 78, via fitting 15, the piston 11 engaging the inside of the flange 92 moves the spring retainer cup 9 away from the end of insert cylinder 45 against the force of compressed spring 7 until balls 94 are moved outwardly by urging of the spring urged tappet 19. The balls 94 move into recesses 96 in the piston 11 and are locked therein by further movement of the tappet 19. Upon release of fluid pressure, the force of spring 7 acts through rod 18, and pistons 66 and 42 to cause actuating rod 28 to operate the brakes. Repressurizing the space behind piston 11 will release the brakes 2. Retraction of the piston 11 and release of the balls 94 allow reseating of the lip 5 against the flange 68 so that the insert cylinder 45 can be removed without disturbing the spring 7.

The insert cylinder 45 has a through bore 3, which extends from below up to the wall 78, within which a piston 66, a piston 47, and the push rod 28 are arranged one behind the other. The mode of operation of these structural elements corresponds again to the mode of operation of the corresponding structural elements in German published application No. 2,840,836, the necessary pressure being supplied through the connection fitting 15. By means of a circlip 88 and a spring retainer 90 and through a spring 39 the push rod 32 is urged in the direction of the piston 47. Differing from the corresponding piston in the state-of-the-art spring energy accumulator, the piston 66 is formed with a circumferential recess 74 which serves to save weight, but the action of the piston 66 is not changed in any way by this feature.

As is known from the German patent application published without examination, No. 2,840,836 (please see, in particular, FIGS. 2 and 3 therein), an adjusting device which is not here shown in the drawing in this instance may be provided within the push rod 28.

It is important for the invention that the insert cylinder 45 is seated by means of a circumferential shoulder 72 on a circumferential, inwardly projecting flange 68 of the spring housing 62 and is detachably secured to it by screws 70. In the event of detachment and removal of the insert cylinder 45, the position and the condition of the compressed spring 7 will not be disturbed by removal of the insert cylinder 45, as will easily be appreciated from the drawing FIG. 3, the spring 7 and spring retainer cup 9 abutted as before against the flange 68. As a result, the hydraulic components and the push rod 32 which are disposed within the insert cylinder may without difficulty be disassembled and reassembled without any effect on the prestressed spring 7.

This also applies analogously when in addition to an adjusting device, the insert cylinder 45 is provided with a dual circuit hydraulic system, with a spring energy accumulator hydraulic system having a hydraulic-mechanical quick-acting release, and with the actuating linkage with adjusting means and with a stroke monitoring sensor and when the insert is being assembled and has to be disassembled together with these elements.

The spring energy accumulator 14 is mounted in the illustrated position pointing obliquely downward at a 45 degree angle on a bearing bracket 25 which is welded to the housing 62 or is cast in one piece with it. The 45 degree angle mounting minimizes the space required.

We claim:

1. A spring energy accumulator comprising: a spring housing of an open ended hollow cylindrical shape having an inwardly turned flange at one end;

a generally cylindrical hollow spring retainer cup nested within said spring housing, said spring retainer cup having an outwardly turned lip at one end abutting against the inside of said spring housing flange with an annular space defined between an outside surface of said retainer cup and an inside surface of said spring housing;

a front end plate mounted to an end of said spring housing opposite said one end, with an axial securing element engaging said end plate and said other end of said spring housing to axially secure said end plate thereto;

a heavy spring disposed in said annular space, compressed between said end plate and said retainer cup lip;

an insert cylinder slidably fit and extending within an inner bore in said retainer cup, said insert cylinder having a shoulder abutting the outside of said inwardly turned flange of said spring housing, and detachable fixing means detachably fixing one end of said insert cylinder to said housing, said insert cylinder formed with an internal lengthwise extending bore opening though another end of said insert cylinder;

said retainer cup having an inwardly turned flange at another end thereof opposite said one end, said another end of said insert cylinder positioned adjacent said inwardly turned flange of said retainer cup;

at least one hydraulically actuated piston fit within said bore, said piston having one end engaging the inside of said inwardly turned flange of said retainer cup;

another end of said piston defining in part a pressurization chamber enabling said piston to force said retainer cup inwardly turned flange away from said another end of said insert cylinder; an engagement rod extending through said piston;

an actuator rod received in said one end of said insert cylinder and engaged by said engagement rod; and means selectively locking said piston to said engagement rod after a predetermined extent of travel through said insert cylinder;

release of said detachable fixing means and retraction of said piston allowing said insert cylinder and piston to be removed from said retainer cup and spring housing without releasing said spring.

2. The spring energy accumulator according to claim 1 wherein said insert cylinder is formed with an inwardly extending partition wall intermediate the length of said insert cylinder, spaced away from said another end of said insert cylinder bore;

said piston adapted to move axially towards and away from said partition wall by pressurization of an intermediate space between said another end of said piston and said partition wall.

3. The spring energy accumulator according to claim 2 further including a bore in said partition wall smaller in diameter than said insert cylinder bore, said engagement rod extending axially in from said other end of said housing through said end plate and said smaller diameter bore in said partition wall.

4. The spring energy accumulator according to claim 1 further including at least one other piston mounted within said internal bore of said insert cylinder on another side of said partition wall of said insert cylinder from said first mentioned piston.

5. The spring energy accumulator according to claim 1 wherein at least one axially extending fastener extend through said shoulder of said insert cylinder and into said spring housing inwardly turned flange, said at least one fastener constituting said detachable fixing means detachably fixing said spring housing to said insert cylinder.

6. A drive train for a track laying vehicle including a hull, a pair of drive sprockets mounted on said hull, one on either side of said vehicle, an engine, a main transmission assembly having outputs on respective ends thereof, said main transmission mounted transversely end-to-end between said drive sprockets but separated therefrom by a drive axle, a pair of brake units, each brake unit having a brake housing mounted on a respective end of said main transmission, a pair of spring energy accumulators each including a heavy precompressed spring, and a separate spring housing containing said precompressed spring, each spring housing mounted to a brake housing of a respective one of said brake units, each spring energy accumulator including an actuating rod protruding from said spring housing and means for selectively causing a force to be applied thereto by said precompressed spring, each brake unit including an actuating lever, and a pinned connection between said actuating rod and actuating lever of each of said spring energy accumulators.

7. The drive train of claim 6 wherein said spring housing of each of said spring energy accumulators has a pedestal fixed to said spring housing, said pedestal fixed to a respective brake unit brake housing to mount said spring housing to a respective brake unit brake housing.

8. The drive train of claim 7 wherein each said spring housing extends at approximately 45° to said respective brake unit brake housing.

9. The drive train of claim 8 wherein said spring housing of each of said spring energy accumulators
is of an open ended hollow cylindrical shape and has an inwardly turned flange at one end;

and, wherein each of said spring energy accumulators further includes:

a generally cylindrical spring retainer cup nested within said spring housing, said spring retainer cup having an outwardly turned lip at one end abutting against the inside of said spring housing flange, an annular space defined between outside surface of said retainer cup and an inside surface of said spring housing, said retainer cup also having an inwardly turned flange at another end opposite said one end;

an end plate mounted to another end of said spring housing, with an axial securing element engaging said end plate and said another end of said spring housing to axially secure said end plate thereto;

a heavy spring disposed in said annular space, compressed between said end plate and said retainer cup lip;

an insert cylinder slidably fit and extending within an inner bore in said retainer cup, said insert cylinder positioned adjacent said inwardly turned flange of said retainer cup; at least one hydraulically actuated piston fit within said bore, one end of said piston engaging the inside of said inwardly turned flange of said retainer cup;

the other end of said piston defining in part a pressurization chamber enabling said piston to force said retainer cup inwardly turned flange away from said other end of said insert cylinder;

an engagement rod extending through said piston;

an actuator rod received in said one end of said insert cylinder and engaged by said engagement rod; and means selectively locking said piston to said engagement rod after a predetermined extent of travel through said insert cylinder;

release of said detachable fixing means and retraction of said piston allowing said insert cylinder and piston to be removed from said retainer cup and spring housing without releasing said spring.

* * * * *